(12) United States Patent
Drepper

(10) Patent No.: US 7,823,022 B2
(45) Date of Patent: Oct. 26, 2010

(54) METHODS AND SYSTEMS FOR FIRST OCCURENCE DEBUGGING

(75) Inventor: Ulrich Drepper, Los Gatos, CA (US)

(73) Assignee: Red Hat, Inc., Raleigh, NC (US)

( * ) Notice: Subject to any disclaimer, the term of this patent is extended or adjusted under 35 U.S.C. 154(b) by 716 days.

(21) Appl. No.: 11/676,786

(22) Filed: Feb. 20, 2007

(65) Prior Publication Data

US 2008/0201613 A1    Aug. 21, 2008

(51) Int. Cl.
 *G06F 11/00* (2006.01)
(52) U.S. Cl. .............................. 714/38; 714/15; 714/45
(58) Field of Classification Search .................. 714/38, 714/15, 45
See application file for complete search history.

(56) References Cited

U.S. PATENT DOCUMENTS

| 5,933,626 | A | * | 8/1999 | Mahalingaiah et al. ...... 712/227 |
| 5,944,841 | A | * | 8/1999 | Christie ........................ 714/38 |
| 6,154,856 | A | * | 11/2000 | Madduri et al. ............... 714/27 |
| 6,240,529 | B1 | * | 5/2001 | Kato ........................... 714/33 |
| 7,343,588 | B2 | * | 3/2008 | Bates et al. .................. 717/125 |
| 2003/0233601 | A1 | * | 12/2003 | Vaid et al. ..................... 714/42 |
| 2007/0006047 | A1 | * | 1/2007 | Zhou et al. .................... 714/38 |
| 2008/0127098 | A1 | * | 5/2008 | Bates et al. ................. 717/124 |

* cited by examiner

*Primary Examiner*—Robert Beausoliel
*Assistant Examiner*—Charles Ehne
(74) *Attorney, Agent, or Firm*—MH2 Technology Law Group LLP

(57) ABSTRACT

An embodiment relates generally to an apparatus for debugging. The apparatus includes a memory configured to store data and an arithmetic logic unit configured to perform logical and arithmetic operations. The apparatus also includes a control unit configured to interface with the memory and arithmetic logic unit and to decode instructions. The control unit is configured to write a data state designated to be overwritten by a currently executing instruction to a buffer allocated in the memory in response to a trace debug flag being set.

13 Claims, 5 Drawing Sheets

METHODS AND SYSTEMS FOR FIRST OCCURENCE DEBUGGING

FIELD

This invention relates generally to debugging systems, more particularly, to methods and systems for a first occurrence debugging.

DESCRIPTION OF THE RELATED ART

When a problem becomes known in an application program, the application program is often placed under the control of a debugger. A debugger is a computer program that is used to test and debug other programs.

If the application program crashes (when a programming bug prevents the application program from progressing) or shows the wrong behavior, a programmer can run the application program under the control of the debugger. The debugger can then run through the application program in a step by step (single-stepping) manner, stopping means of a breakpoint, and tracking the values of some variables.

However, there are disadvantages and drawbacks with this conventional method of debugging. For example, it may not be enough to examine the current state of the application program because data has been destroyed while executing the code until the point of interruption. That is, the problem may be occurring several steps prior to the interruption point. As a result, debug time can be substantially increased due to the iterative process of setting an earlier breakpoint and restarting and so forth.

One technique of overcoming this drawback is to have debuggers which actually execute the code instruction and save the data which is going to be lost in each instruction execution. This then allows the debugger to step back in time from each point in the program. However, there are also drawbacks and disadvantages. More particularly, this particular method of debugging is slow since the program is executing in a non-native environment, i.e., the debugger, which is basically an emulation/simulation. It also introduces problems due to the possible incompatibility of the emulation and the native execution of the code.

BRIEF DESCRIPTION OF THE DRAWINGS

Various features of the embodiments can be more fully appreciated, as the same become better understood with reference to the following detailed description of an embodiment when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of computing systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate generally to systems, apparatus, and methods for central processing unit (CPU) and kernel extensions for hardware support of a debugger. More particularly, a CPU can be configured to be provided with a buffer when a trace mode is enabled in the debugger. Accordingly, the CPU can then monitor the execution of a program to determine whether the currently executing instruction changes state. If the currently executing instruction changes state, the CPU can be configured to store the current state which is destroyed by the selected instruction in the buffer along with a timestamp and address of the instruction and then execute the selected instruction. The CPU can also be configured to notify the kernel in the event of the buffer being in an overflow condition. The kernel extensions can be configured to allow the contents of the buffer to be transferred to a memory location available to the debugger or allocate a new buffer in response to a full buffer or overflow. Accordingly, the kernel extensions create an instruction by instruction transcript of the execution of the program, which can be re-executed in the forward or backward direction.

As such, a debugger can undo the effects of the program instruction by re-executing the recorded data states. The associated time stamps are used the correlate the records created by different threads in the same program. After debug, the collection of the data states can be discarded. In other embodiments, the recorded data states can be saved and replayed with the proviso that the recorded data is useful when the program hasn't changed at all between the first and second executions.

Figure 1:
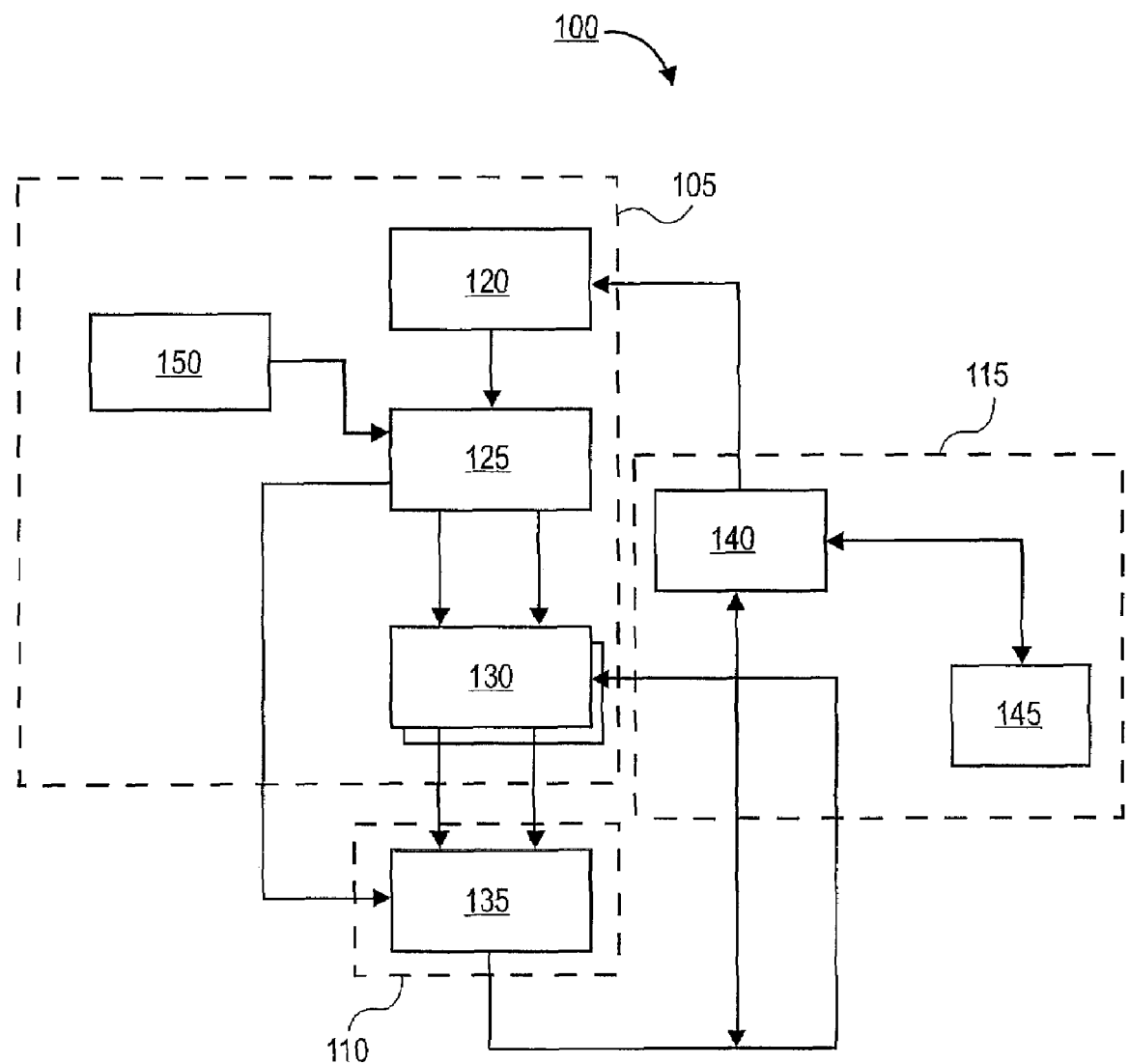
FIG. 1 illustrates an exemplary debug-enabled CPU in accordance with an embodiment.

FIG. 1 depicts a simplified diagram of a debug-enabled central processing unit ("CPU") 100 in accordance with an embodiment of the invention. It should be readily apparent to those of ordinary skill in the art that the debug-enabled CPU 100 depicted in FIG. 1 represents a generalized schematic illustration and that other components may be added or existing components may be removed or modified.

As shown in FIG. 1, the debug-enabled CPU 100 can comprise a control unit 105, an arithmetic logic unit ("ALU") 110, and a memory 115. The control unit 105 may further comprise an instruction fetcher 120, an instruction decoder 125, and registers 130. The instruction fetcher 120 may be configured to retrieve an instruction from a program memory, which is pointed by a program counter (not shown). As known to those skilled in the art, the program counter keeps track of the CPU's location in a currently executing program. The fetched instruction can then be decoded by the instruction decoder 125. As part of the decode process, the fetched instruction is interpreted against an instruction set 150. The instruction set 150 of the debug-enabled CPU 100 can be configured to include the typical instruction set associated with various processors such as Intel x86, PowerPC, 68xxx, or other similar computing devices. However, in accordance with various embodiments, the instruction set 150 includes several classes of instructions, i.e., instructions which destroy state, where the interpretation of these selected instructions direct the CPU to record the current state of the registers/memory in a buffer prior to the execution of the selected instruction. More particularly, instruction decoder 125 can determine that the current instruction can alter or destroy information in the processor and then record the current state of the processor with a timestamp and the address of the current instruction prior to the execution of the current instruction. The classes of instructions that can alter the processing state or destroy information can include a move instruction that moves memory content into a register, a move instruction that moves content of a register into memory, a jump instruction that does not records the address of the previously executed instruction, an addition instruction that destroys the value of the target register as well as any associated condition flags, etc.

The registers 130 may provide buffer space to temporarily store data used by the execution of computer programs. The registers 130 can be implemented using digital circuit techniques known to those skilled in the art.

In various embodiments, the processor can be configured to write the current state of the processor along with a global timestamp and the address of the instruction causing the state change in a buffer allocated by an operating system. The timestamp is global to order records from execution of multi-threaded applications on symmetric multiprocessing ("SMP")/hyper-threading ("HT")/cellular multiprocessing ("CMP") machines. Accordingly, the use of the global timestamp ensures a mechanism to determine in which order instructions on two or more CPUs were executed.

Referring to the buffer, when the buffer the operating system provides to the CPU to temporarily store the generated records overflows, the kernel of the operating system can be configured to notify an application (e.g., a debugger). The debugger can then collect the information from the buffer to use for debugging operations. Moreover, the debugger can provide an additional buffer or copy the buffer content to clear the buffer so it can be reused.

The ALU 110 can be configured to calculate arithmetic operations (additions, subtraction, multiplication, and division) and logic operations (AND, OR, XOR, NOR, etc.). The ALU 110 may be implemented as a digital circuit 135 as known to those skilled in the art.

The memory 115 may comprise memory interface 140 and a memory 145. The memory interface 140 may be configured to provide an interface to the memory 145 for the CPU to transfer data between the registers 130 and the memory 145 depending on the type of instruction being executed.

Figure 2:
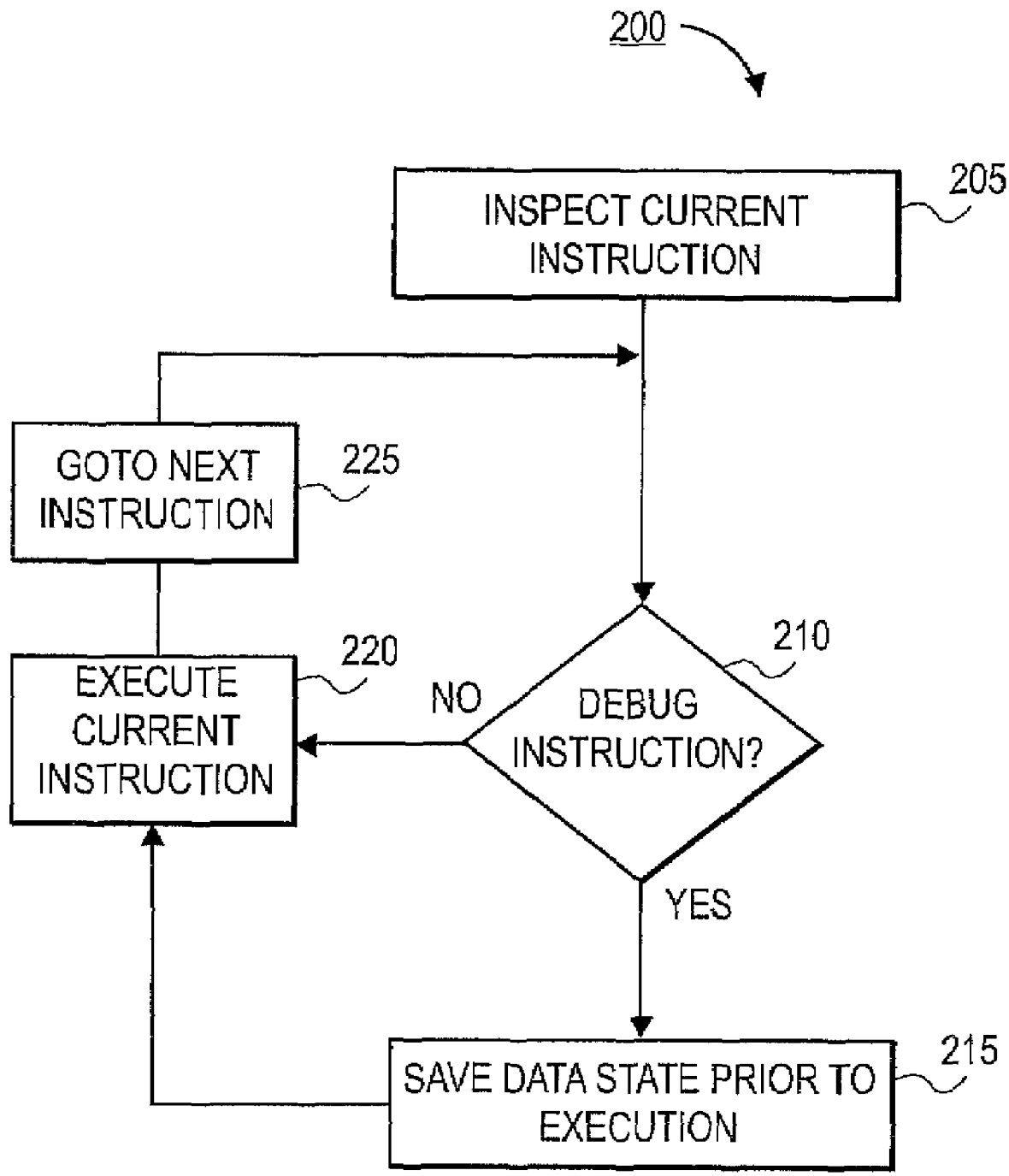
FIG. 2 illustrates an exemplary flow diagram in accordance with another embodiment.

FIG. 2 depicts a flow diagram 200 implemented by the instruction decoder 125 in accordance with another embodiment. It should be readily apparent to those of ordinary skill in the art that the flow diagram depicted in FIG. 2 represents a generalized schematic illustration and that other steps may be added or existing steps may be removed or modified.

The flow diagram 200 is premised on a debugger application being invoked. Thus, as shown in FIG. 2, the instruction decoder 125 can be configured to retrieve the current instruction indicated by the program counter and inspect the current or selected instruction, in step 205.

If the current instruction is a debug instruction, i.e., an instruction that alters the state or destroys information, in step 210, the instruction decoder 125 can be configured to write the current data state to a buffer in the memory 145, in step 215. The buffer may have been allocated by the kernel in response to the invocation of the debugger application. The instruction decoder 125 can then execute the current instruction, in step 220. Subsequently, the instruction decoder 125 can go to the next instruction indicated by the program counter, in step 225.

Otherwise, if the instruction decoder 125 determines that the current instruction is not a debug instruction, in step 210, the instruction decoder 125 can execute the current instruction, in step 220. Subsequently, the instruction decoder 125 can proceed to the processing associated with and go to the next instruction pointed by the program counter, in step 225.

Figure 3A:
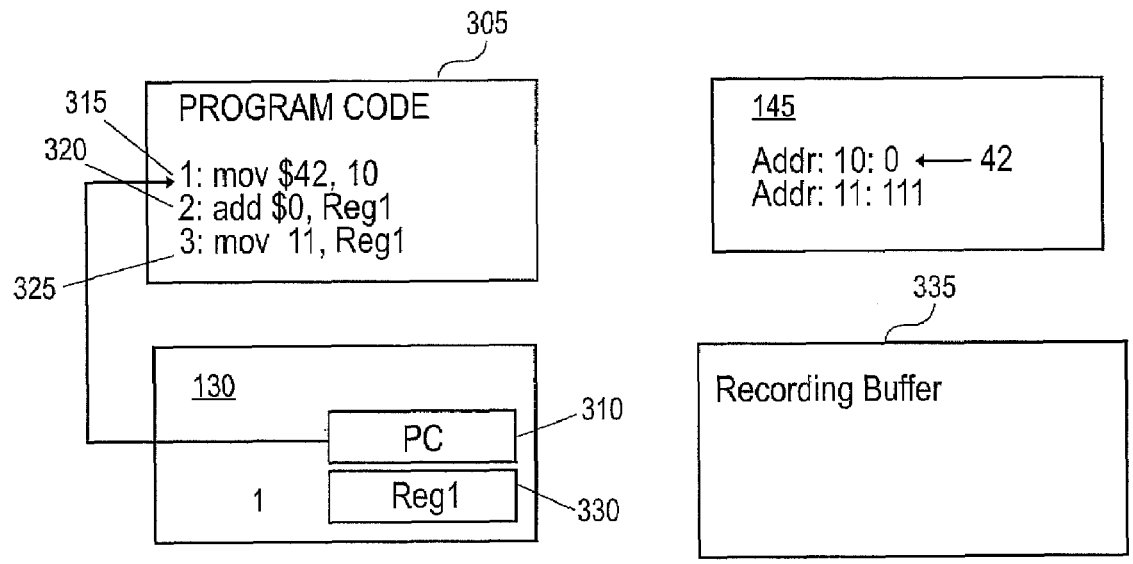
FIGS. 3A-D illustrates an exemplary processing of debug instructions in accordance with yet another embodiment.

FIGS. 3A-D depict execution of several lines of program code in accordance with yet another embodiment. As shown in FIG. 3A, program code 305 may be executing on the debug-enabled CPU 100. The memory 145 may contain two address locations: Address 10 (labeled as Addr: 10 in FIGS. 3A-D) which initially contains the value of zero and Address 11 (labeled as Addr: 11 in FIGS. 3A-D) which initially contains the value of 111. A program counter 310 can point to instruction 1 315 in the program code 305. The instruction decoder 125 can determine that the instruction 1 315 is going to destroy information, i.e., the value of 42 is moved to address 10. Accordingly, the instruction decoder 125 can be configured to write the value of the current state of Address 10 as "At address 1 restore value zero at Address 10" with a global timestamp and the address of the instruction in the recording buffer 335 after the execution of instruction 1 315.

Figure 3B:
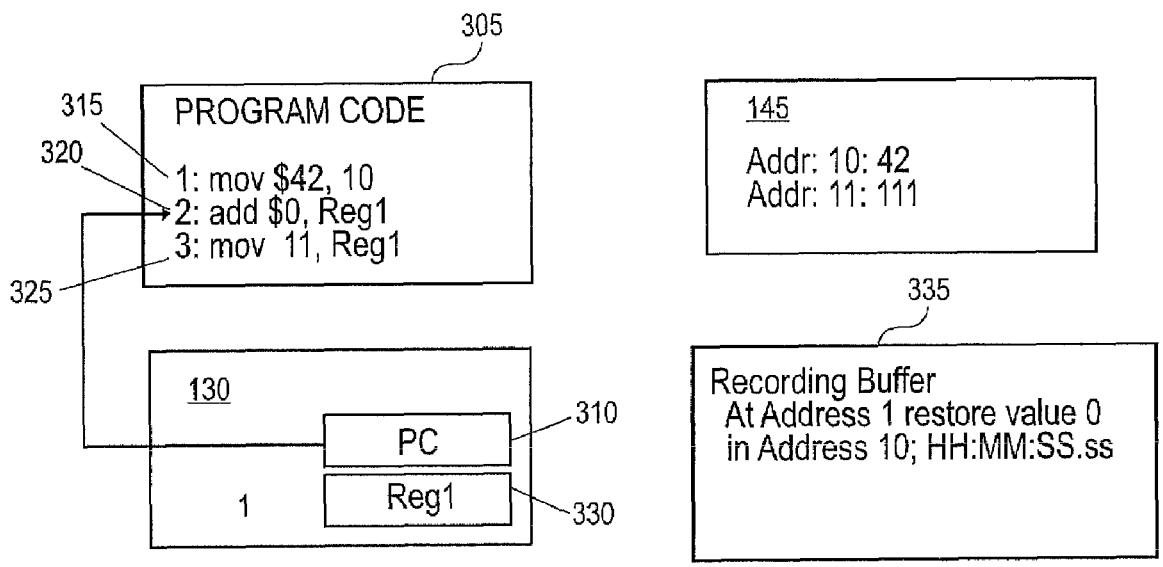

As shown in FIG. 3B, the recording buffer 335 contains the instruction: "at Address 1, restore value 0" as a result of the instruction 1 execution. The program counter 310 can increment and now point to instruction 2 320. Although the instruction 2 320 is an addition instruction which typically invokes the processing associated with debug instructions, instruction 2 320 adds zero to the content of Reg 1 330 (the value being one). Adding zero to a content of a memory address or a register does not alter the state of the memory address or register. Accordingly, the instruction decoder 125 can execute the instruction 2 320 as instructions are processed during normal, non-debug operation.

Figure 3C:
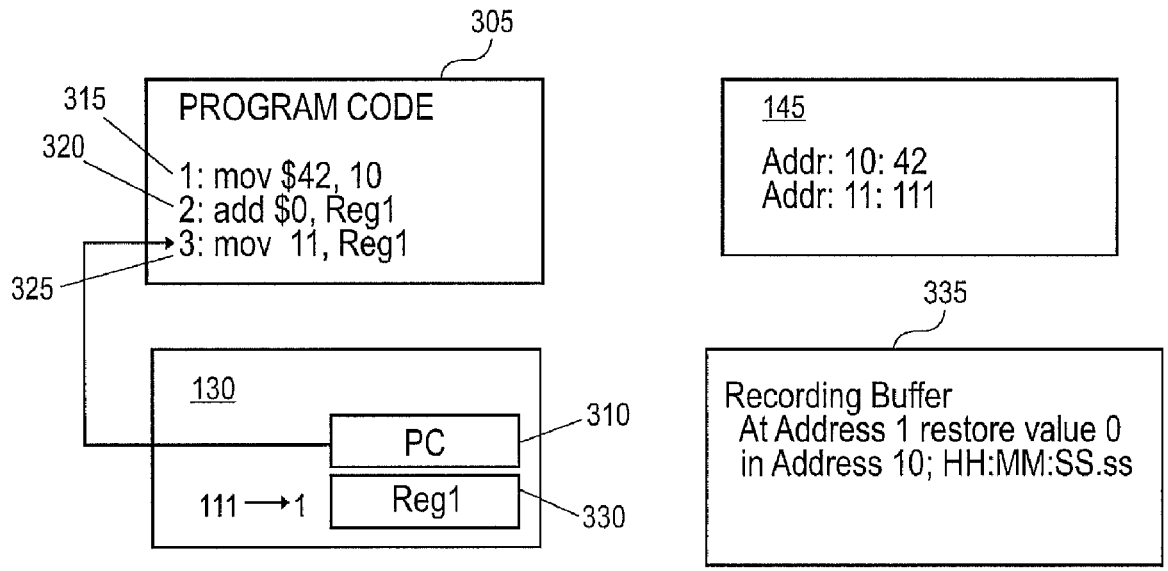

As shown in FIG. 3C, the program counter 310 has incremented again and points to instruction 3 325. The instruction decoder 125 may determine that instruction 3 325 alters state information, i.e., "move the contents of address 11 in register Reg1". Accordingly, the instruction decoder 125 can write the contents of current value of Reg1 330, i.e., a data state, into the recording buffer 335 as "At address 3 restore Value 1 in register Reg1" with a global timestamp of the instruction execution after the instruction 3 325 executes. The instruction decoder 125 can be configured to write the data state in a form that can be readily executed by a processor. For example, the recorded data state can be written as a series of assembly instructions because every assembly instruction can be reversed by another or series of assembly instruction.

Figure 3D:
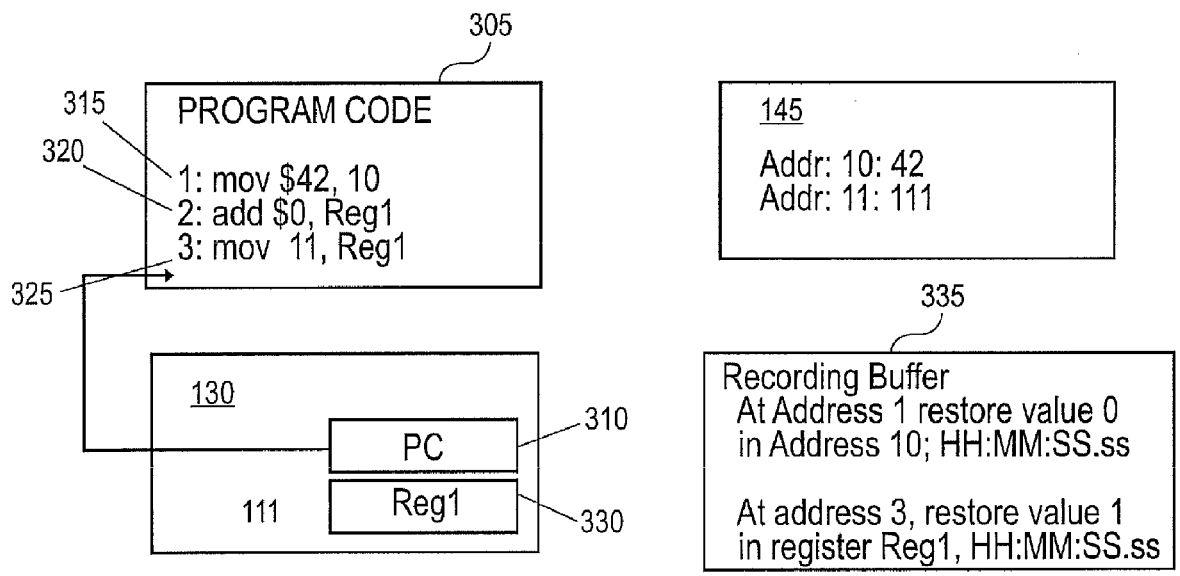

As shown in FIG. 3D, the program counter 310 has further incremented and points to the instruction after instruction 3 325. Address 10 of memory 145 stores the value of 42 and the Reg1 330 stores the 111 as executed by the previous three instructions. The recording buffer 335 contains the two data states recorded by instruction 1 315 and instruction 3 325. Going backward from the state in FIG. 3D, it is possible to use the information from the recording buffer 335 and the instruction stream to restore the state in FIG. 3A.

Figure 4:
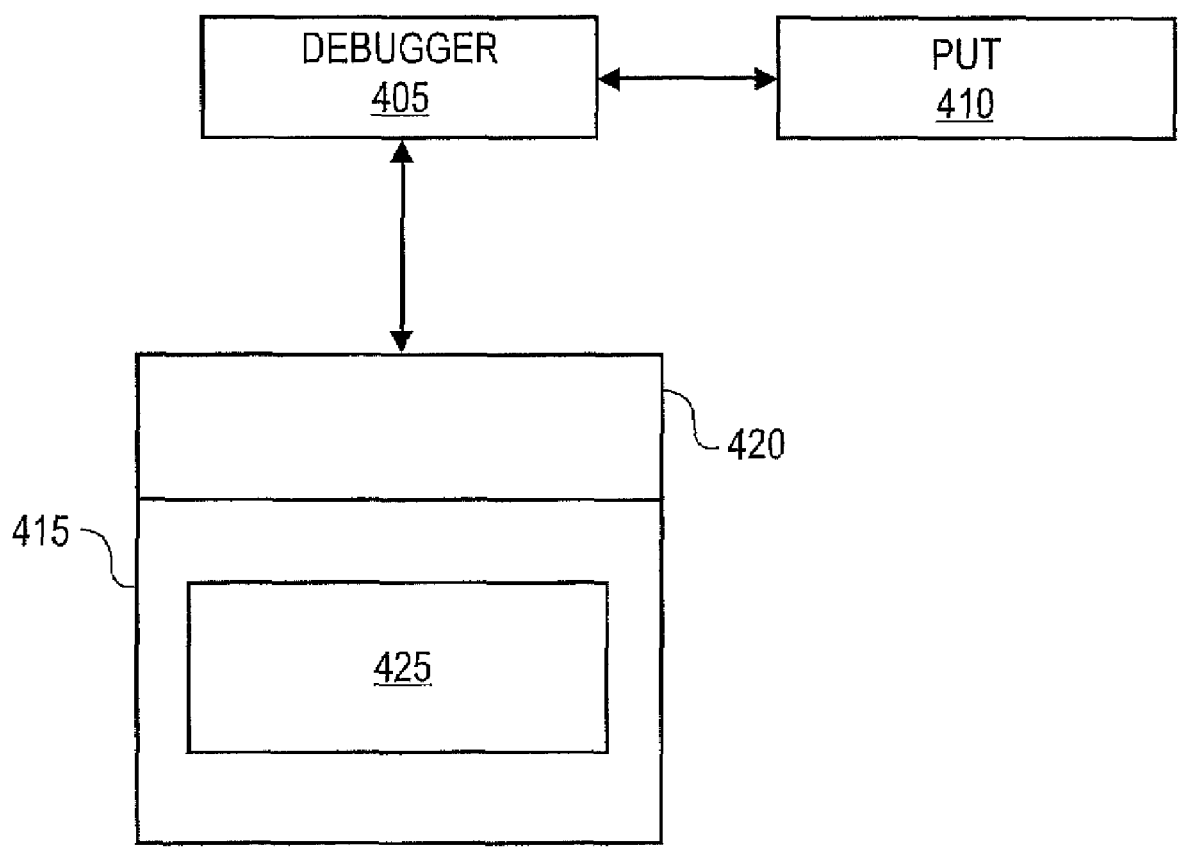
FIG. 4 illustrates an exemplary software system in accordance with another embodiment.

FIG. 4 illustrates an exemplary application system 400 in accordance with yet another embodiment. It should be readily apparent to those of ordinary skill in the art that the application system 400 depicted in FIG. 4 represents a generalized schematic illustration and that other components may be added or existing components may be removed or modified.

As shown in FIG. 4, application system 400 can include a debugger 405, a program-under-test ("PUT") 410, and an operating system 415. The debugger 405 can be a program to assist user to determine faults, errors or bugs associated with the PUT 410. The debugger 405 can have capabilities such as showing the position in the source code of a fault or error, single stepping, breaking, setting breakpoints, and other features known to those skilled in the art.

The PUT 410 can be a software application being developed by a user or entity. The PUT 410 can have been developed using well known software development toolkits or other programming techniques.

The operating system 415 can be a version of a Linux™, UNIX™, Windows™, or similar multi-tasking operating system. A run-time environment 420 can be configured to execute on the operating system 415. The run-time environment 420 can provide a set of software that supports the execution of the debugger 405. The run-time environment 405 can include an application program interface ("API", not shown) and a complementary API (not shown) within the debugger 405. The API can be configured to provide a set of routines that the debugger 405 uses to request lower-level services performed by the operating system 415. The operating system 415 can include a kernel 425. The kernel 425 can be configured to provide secure access to the underlying hardware of the debug-enabled CPU 100.

The kernel 425 can also be configured to provide support for the debug-enabled CPU 100. More particularly, the debug-enabled CPU 100 can be configured to allocate a buffer to write the current data state of an execution if the executed instruction changes or destroys information.

The kernel 425 can further be configured to notify the debugger 405 of a buffer overflow by providing a flag to be set when recording buffer 335 becomes full. The kernel 425 can then allow the debugger 405 to copy the contents of the buffer 335 or to allocate a new buffer.

The data recorded by the debug-enabled CPU 100 can be replayed in reverse to restore an earlier state of the original execution. In one embodiment of this invention the replay can be performed by the CPU with help of the operating system kernel. In another embodiment of the invention the debugger 405 can perform the necessary actions. The replay implements a reversal in the execution flow. The recorded data, thus, in effect, becomes a transcript for the program execution. It can be used to recreate the state of the program at any previous point in time. However, for operations that depend on third party information, such as system calls, the debugger 405 may be configured to replay, and not re-execute, these operations.

Accordingly, various embodiments improve the conventional debugging systems. For example, embodiments of the present invention are considerably faster because there is no emulation. Since there is no emulation, there are no adjustments needed when a manufacturer introduces new instructions and no bugs in the emulator to affect the result. Moreover, the debug-enabled CPU only requires help when the buffer is full. By providing a sufficiently large buffer, much of the code can be executed at nearly normal speed.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of monitoring, the method comprising:
determining whether a currently executing instruction changes a current data state in a central processing unit;
writing the current data state to a buffer of the central processing unit only when the currently executing instruction is configured to overwrite the current data state;
receiving notification of a buffer overflow flag being set for the buffer from an operating system kernel; and
writing at least one data state from the buffer to a separate memory space to form an execution log in response to the setting of the buffer overflow flag.

2. The method of claim 1, wherein the buffer is accessible by a debugger program.

3. The method of claim 1, further comprising:
executing a current instruction; and
reversing the current instruction by retrieving a respective data state from the execution log to restore the state of the central processing unit prior to the executed current instruction.

4. The method of claim 1, further comprising:
executing a debugger program, wherein the debugger program has access to the execution log;
stopping an execution of a program being debugged by the debugger program; and
reversing a current instruction by retrieving a respective data state from the execution log to restore a state of the central processing unit.

5. The method of claim 4, further comprising retrieving a previous data state from the execution log to restore a previous state of the central processing unit.

6. The method of claim 4, wherein the step of stopping an execution of the program further comprises stopping at a point prior to a selected error.

7. The method of claim 1, wherein the at least one data state is written in a form directly executable by a processor.

8. A system for hardware debugging, the system comprising:
a central processing unit configured to execute an application program under a debugger program,
wherein the central processing unit is configured to write a current data state to the allocated buffer only when the current data state will be overwritten by a currently executing instruction, and wherein the debugger program is configured to receive notification of a buffer overflow flag being set in the buffer from an operating system kernel, and to collect at least one data state from the buffer to form an execution log in response to the setting of the buffer overflow flag.

9. The system of claim 8, wherein the application program is configured to execute a current instruction and the debugger is configured to reverse effects of the current instruction by retrieving a respective data state from the execution log to restore the state of the central processing unit prior to the current instruction.

10. The system of claim 8, wherein the debugger program is configured to access the execution log, stop the execution of the application program, and reverse a current instruction by retrieving a respective data state from the execution log to restore a state of the central processing unit.

11. The system of claim 10, wherein the debugger program is further configured to retrieve a previous data state from the execution log to restore a previous state of the central processing unit.

12. The system of claim 10, wherein the debugger program is further configured to advance the application program to a next stopping point determined by a user.

13. The system of claim 8, wherein the respective data state is written in a form directly executable by a processor.

* * * * *